United States Patent
Guo et al.

(10) Patent No.: US 11,981,767 B2
(45) Date of Patent: May 14, 2024

(54) SOLVENTLESS ADHESIVE COMPOSITION AND PROCESS FOR MAKING AND USE IN FORMING A LAMINATE

(71) Applicants: Dow Global Technologies LLC, Midland, MI (US); Rohm and Haas Company, Collegeville, PA (US)

(72) Inventors: Yinzhong Guo, Lake Jackson, TX (US); Mai Chen, Buffalo Grove, IL (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 512 days.

(21) Appl. No.: 17/294,127

(22) PCT Filed: Nov. 13, 2019

(86) PCT No.: PCT/US2019/061249
§ 371 (c)(1),
(2) Date: May 14, 2021

(87) PCT Pub. No.: WO2020/102402
PCT Pub. Date: May 22, 2020

(65) Prior Publication Data
US 2022/0017677 A1    Jan. 20, 2022

Related U.S. Application Data

(60) Provisional application No. 62/768,281, filed on Nov. 16, 2018.

(51) Int. Cl.

| | |
|---|---|
| *C08G 18/38* | (2006.01) |
| *B32B 27/40* | (2006.01) |
| *C08G 18/10* | (2006.01) |
| *C08G 18/42* | (2006.01) |
| *C08G 18/50* | (2006.01) |
| *C08J 5/12* | (2006.01) |
| *C09J 175/08* | (2006.01) |

(52) U.S. Cl.
CPC ............. *C08G 18/10* (2013.01); *B32B 27/40* (2013.01); *C08G 18/3885* (2013.01); *C08G 18/42* (2013.01); *C08G 18/5045* (2013.01); *C08J 5/128* (2013.01); *C09J 175/08* (2013.01); *B32B 2375/00* (2013.01)

(58) Field of Classification Search
CPC ..... B32B 27/40; B32B 2375/00; C08G 18/10; C08G 18/3885; C08G 18/42; C08G 18/5045; C08J 5/125; C09J 175/08
See application file for complete search history.

(56) References Cited

U.S. PATENT DOCUMENTS

| | | |
|---|---|---|
| 8,835,009 B2 | 9/2014 | Shah et al. |
| 9,453,152 B2 | 9/2016 | Carlson et al. |
| 9,580,538 B2 | 2/2017 | Kollbach et al. |
| 2010/0119821 A1 | 5/2010 | Uemura et al. |
| 2017/0226391 A1 | 8/2017 | Vietti et al. |

FOREIGN PATENT DOCUMENTS

| | | | |
|---|---|---|---|
| EP | 3327056 A1 | 5/2018 | |
| WO | 2011/109720 A1 | 9/2011 | |
| WO | 2012/006156 A1 | 1/2012 | |
| WO | 2015/168670 A1 | 11/2015 | |
| WO | 2017/196530 A1 | 11/2017 | |
| WO | 2018/049672 A1 | 3/2018 | |
| WO | WO-2018049672 A1 * | 3/2018 | ............. C08G 18/12 |

* cited by examiner

*Primary Examiner* — Michael L Leonard
(74) *Attorney, Agent, or Firm* — Boyle Fredrickson, S.C.

(57) ABSTRACT

The present disclosure provides a process comprising providing an isocyanate component A comprising a blend of (i) an aromatic isocyanate prepolymer and (ii) an aliphatic isocyanate prepolymer; providing a polyol component B comprising a blend of; (i) a phosphate-functional polyol, (ii) a polyether polyol, and (iii) an element selected from the group consisting of a polyurethane polyol, a polyester polyol and a combination thereof; mixing component A and component B to form a solventless adhesive (SLA) composition, wherein a weight ratio of component A to component B is from 2:1 to 1:1, the SLA composition having a pot life from 30 min to 60 min at 40 C; applying the SLA composition between a first film and a second film to form a raw laminate; and curing the raw laminate to form a laminate product.

13 Claims, No Drawings

SOLVENTLESS ADHESIVE COMPOSITION AND PROCESS FOR MAKING AND USE IN FORMING A LAMINATE

BACKGROUND

Composite laminated films are known in the field of packaging materials. These films are conventionally produced by bonding various plastic films and metal foils with an adhesive. The adhesive is often an organic solvent-based two-component curable adhesive comprising polyisocyanates, polyester polyols and polyether polyols.

Increasing regulations upon the use of solvents have led to the replacement of organic solvent-based adhesives with solvent-free, or solventless, adhesives in the production of composite laminated films. Solventless adhesives provide economic, environmental, health, and safety benefits. For example, solvent-based (i.e., conventional) adhesives are commonly applied at line speeds less than 120 m/min (400 ft/min). Solventless adhesives can be applied in a completely liquid state at line speeds around 300 m/min (1000 ft/min) thereby reducing energy consumption and operational costs. Before solventless adhesives can be used in place of solvent-based (i.e., conventional) adhesives more broadly, several gaps in the performance of solventless adhesives must be addressed. For instance, deterioration of the film appearance is common when laminating with solventless adhesives at line speeds greater than 120 m/min (400 ft/min). Deterioration of film appearance becomes even more problematic with films having high $CO_2$ content and/or high moisture barrier properties such as polyethylene terephthalate films, nylon films, metalized films, and aluminum foils. One approach to offset deterioration of film appearance is to reduce the viscosity of the solventless adhesive in order to improve wetting on the film substrate. Unfortunately, by reducing viscosity, transferring efficiency is lowered resulting in a lower coating weight of the applied adhesive. Another approach for reducing viscosity is achieved by using adhesive starting materials with relatively low molecular weight. The low molecular weight materials can reduce the initial adhesive strength, increase ink smearing of the laminate product and create material leakage during the coat process. Product resistance is a critical parameter in food packaging applications that can be impacted negatively by low molecular weight materials.

The components of adhesive compositions can react with moisture to produce $CO_2$. The reaction can occur during the lamination process and within the finished laminate product and creates outgassing within the seal of the laminate. Outgassing can degrade the appearance of the laminate and also degrade seal integrity of the laminate. Solventless adhesive components (e.g., aromatic polyisocynates such as MDI) are particularly prone to outgassing. The high humidity environment and high moisture barrier properties common in the flexible pouches used in food packaging applications also increase the occurrence of outgassing. The elevated heat and pressure used when manufacturing flexible pouches can cause solventless adhesive components (e.g., aromatic polyisocynates such as MDI or TDI) to react with moisture and produce aromatic amides. The aromatic amide byproducts can migrate within the laminate and deteriorate the seal integrity of the laminate. Amide induced seal deterioration is termed "anti-seal." Urethane groups of aromatic isocyanates can react with moisture to produce toxic primary aromatic amines (PAAs). Conversion of aromatic polyurethanes into PAAs is termed "PAA decay." Solventless adhesive components are particularity prone to PAA decay.

The art recognizes the need for solventless adhesives for the improved overall performance and methods of producing laminates using solventless adhesives.

SUMMARY

The present disclosure provides a process comprising providing an isocyanate component A comprising a blend of (i) an aromatic isocyanate prepolymer and (ii) an aliphatic isocyanate prepolymer; providing a polyol component B comprising a blend of; (i) a phosphate-functional polyol, (ii) a polyether polyol, and (iii) an element selected from the group consisting of a polyurethane polyol, a polyester polyol and a combination thereof; mixing component A and component B to form a solventless adhesive (SLA) composition, wherein a weight ratio of component A to component B is from 2:1 to 1:1, the SLA composition having a pot life from 30 min to 60 min at 40° C.; applying the SLA composition between a first film and a second film to form a raw laminate; and curing the raw laminate to form a laminate product.

Also provided is a two-component solventless adhesive (SLA) composition comprising an isocyanate component A comprising a blend of (i) an aromatic isocyanate prepolymer and (ii) an aliphatic isocyanate prepolymer; a polyol component B comprising a blend of; (i) a phosphate-functional polyol, (ii) a polyether polyol, and (iii) an element selected from the group consisting of a polyurethane polyol, a polyester polyol and a combination thereof; the composition having a weight ratio of component A to component B from 2:1 to 1:1; a pot life from 30 min to 60 min at 40° C.; and a primary aromatic amine decay level from 0.1 pbb to 1.4 pbb after 24 hours curing at 25° C. and 50% humidity.

Also provided is a laminate product comprising a first film; a second film; and a solventless adhesive composition disposed between the first film and the second film, the solventless adhesive composition comprising (a) an isocyanate component A comprising a blend of (i) an aromatic isocyanate prepolymer and (ii) an aliphatic isocyanate prepolymer; (b) a polyol component B comprising a blend of (i) a phosphate-functional polyol, (ii) a polyether polyol, and (iii) an element selected from the group consisting of a polyurethane polyol, a polyester polyol and a combination thereof; the composition having a weight ratio of component A to component B from 2:1 to 1:1; a pot life from 30 min to 60 min at 40° C.; and a primary aromatic amine decay level from 0.1 pbb to 1.4 pbb after 24 hours curing at 25° C. and 50% humidity.

Definitions

Any reference to the Periodic Table of Elements is that as published by CRC Press, Inc., 1990-1991. Reference to a group of elements in this table is by the new notation for numbering groups.

For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges disclosed herein include all values from, and including, the lower and upper value. For ranges containing explicit values (e.g., a range from 1, or 2, or 3 to 5, or 6, or 7), any subrange between any two explicit values is included (e.g., the range 1-7 above includes subranges 1 to 2; 2 to 6; 5 to 7; 3 to 7; 5 to 6; etc.).

Unless stated to the contrary, implicit from the context, or customary in the art, all parts and percents are based on weight and all test methods are current as of the filing date of this disclosure.

The term "composition" refers to a mixture of materials which comprise the composition, as well as reaction products and decomposition products formed from the materials of the composition.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term "consisting essentially of" excludes from the scope of any succeeding recitation any other component, step, or procedure, excepting those that are not essential to operability. The term "consisting of" excludes any component, step, or procedure not specifically delineated or listed. The term "or," unless stated otherwise, refers to the listed members individually as well as in any combination. Use of the singular includes use of the plural and vice versa.

An "isocyanate" is a compound that contains at least one isocyanate group in its structure. An isocyanate group is represented by the formula: —N=C=O. A "polyisocyanate" is an isocyanate containing more than one, or at least two, isocyanate groups. A polyisocyanate having two isocyanate groups is a diisocyanate and an isocyanate having three isocyanate groups is a triisocyanate, etc. Isocyanates include aromatic isocyanates, aromatic polyisocyanates, aliphatic isocyanates and aliphatic polyisocyanates.

A "polyether" is a compound containing two or more ether linkages in the same linear chain of atoms.

A "polyester" is a compound containing two or more ester linkages in the same linear chain of atoms.

A "polymer" is a polymeric compound prepared by polymerizing monomers, whether of the same or a different type. The generic term polymer thus embraces the term "homopolymer" (employed to refer to polymers prepared from only one type of monomer, with the understanding that trace amounts of impurities can be incorporated into the polymer structure), and the term "interpolymer," which includes copolymers (employed to refer to polymers prepared from two different types of monomers), terpolymers (employed to refer to polymers prepared from three different types of monomers), and polymers prepared from more than three different types of monomers. Trace amounts of impurities, for example, catalyst residues, may be incorporated into and/or within the polymer. It also embraces all forms of copolymer, e.g., random, block, etc. It is noted that although a polymer is often referred to as being "made of" one or more specified monomers, "based on" a specified monomer or monomer type, "containing" a specified monomer content, or the like, in this context the term "monomer" is understood to be referring to the polymerized remnant of the specified monomer and not to the unpolymerized species. In general, polymers herein are referred to has being based on "units" that are the polymerized form of a corresponding monomer.

A "polyol" is an organic compound containing multiple hydroxyl (—OH) groups. In other words, a polyol contains at least two hydroxyl groups. Nonlimiting examples suitable polyols include diols (which contain two hydroxyl groups) and triols (which contain three hydroxyl groups).

A "propylene-based polymer" is a polymer that contains more than 50 weight percent polymerized propylene monomer (based on the total amount of polymerizable monomers) and, optionally, may contain at least one comonomer. Propylene-based polymer includes propylene homopolymer, and propylene copolymer (meaning units derived from propylene and one or more comonomers). The terms "propylene-based polymer" and "polypropylene" are used interchangeably.

The "number average molecular weight" of a polymer sample is the statistical average molecular weight of the individual macromolecules with in the sample. Number average molecular weight is represented by "Mn". Mn is calculated with the equation $$\overline{M}_n = \frac{\sum_i N_i M_i}{\sum_i N_i}$$

where $N_i$ is the number of molecules of molecular mass $M_i$.

The "weight average molecular weight" of a polymer sample is an alternative description that embodies the effects to properties caused by the size of the individual macromolecules. Weight average molecular weight is represented by "Mw". Mw is calculated with the equation $$\overline{M}_w = \frac{\sum_i N_i M_i^2}{\sum_i N_i M_i}$$

Test Methods

Pot life test: "Pot life" is the curing time needed for the viscosity of an adhesive composition to rise above 4500 mPa·s at 40° C., the curing time measured after the components of the adhesive composition are mixed. The components of the adhesive composition are mixed with a Flac-Tack high speed mixer at 1800 to 2000 rpm for 1 minute. The viscosity of the adhesive composition is monitored with respect to time. Viscosity is measured at 40° C. with a Brookfield Viscometer DV II having a #27 spindle spinning at, 20 rpm, #27 spindle. Pot life is reported in minutes (min).

Primary aromatic amine (PAA) decay test: Urethane groups of aromatic isocyanates can can react with moisture (i.e., decay) to produce primary aromatic amines (PAAs). The amount of PAA detected is termed a "PAA decay level" and is reported in parts per billion (ppb). The PAAs are converted into diazo derivatives that are analyzed photometrically. A diazo derivative concentration is used to determine a concentration of PAA that is reported as the PAA decay level. Acceptable PAA decay level is less than 2 parts per billion (ppb) per the test method described herein.

For the PAA decay test, pouches are formed by cutting a strip of 30.5 cm×16.5 cm from the middle section of a laminate prepared as described herein. Each strip is folded to form a 14 cm×16.3 cm surface area, and heat sealing an edge of about 1 cm along each open longitudinal edge of the folded strip to form a pouch with an inner surface area of 14 cm×14.3 cm. The equipment used for heat sealing the edges is a Brugger HSG-C. Sealing conditions for the laminates are 1.3 to 1.5 bar and 130 to 160° C. Four pouches (two blanks and two test pouches), each with an inner surface area of from 195 to 200 cm², are used for each sample or example in this study. Each pouch is formed after two days from the time of formation of the respective laminate. Prior to forming a pouch, the laminate is stored at room temperature under ambient atmosphere. Each pouch is filled with 100 ml of 3% aqueous acetic acid, which is used as the food simulant. The pouches are stored at 70° C. in an air circulation oven for two hours. After cooling the pouches to room temperature, 100 ml of test solution is mixed with 12.5 ml of hydrochloric acid solution (1N) and 2.5 ml of sodium nitrite solution (0.5 g per 100 ml of solution), and the contents are allowed to react for ten minutes. Ammonium sulfamate (5 ml; 2.5 g per 100 ml of aq. solution) is added and allowed to react for ten minutes. A coupling reagent (5 ml; 1 g of N-(1-naphtyl)-ethylenediamine dihydrochloride per 100 g of aq. solution) is added, and allowed to react for two hours, giving a violet solution. After each addition, the resulting mixture is stirred with a glass rod. For the "blank pouches," 100 ml of the test solution is mixed with the derivation reagents as discussed above, except for the sodium nitrite.

The solution is concentrated by elution through an ODS solid phase extraction column (ODS reverse phase, C18 endcapped). The column is conditioned using, first, 10 ml of methanol, then 10 ml elution solvent, and then 10 ml aqueous hydrochloric acid solution (0.1 N). Each diazo derivatized sample is added to the column using a glass beaker previously rinsed twice with 3 ml of aqueous hydrochloric acid solution (0.1 N). The column is subject to a vacuum (about 2.5 mm Hg) pull, to remove all rinse, for one minute. Then 5 ml of elution solvent is added to the column, and this step is repeated until 10 ml of eluent is collected.

Photometric analyses is conducted by measuring the extinction coefficient of the diazo reaction product at 550 nm using a Spectrophotometer Lambda from Perkin Elmer. The diazo product samples are measured in a 5 cm cell against the reagent blank solution and a series of standards with known concentrations of aniline hydrochloride that are processed in parallel.

Bond strength test: The bond strength test used herein is a combination of ASTM D1876 and ASTM D903. Bond strength testing includes a 90° T-peel test performed on the laminate samples cut into 1 inch wide strips and tested on a THWING ALBERT™ INSTRON peel tester equipped with a 50N loading cell at a rate of 25.4 cm/min. When the two films forming the laminate separate, i.e., peel, the average of the force during the pull is recorded. If one of the films stretches or breaks, the maximum force or force at break is recorded. Results are reported in grams per 25 millimeters (g/25 mm). The value recorded is the average of testing performed on three separate laminate samples. The test method is hereafter referred to as the "bond strength test."

Anti-seal test: "Anti-seal" is a measure of the bond strength of a laminate after the laminate has been exposed to elevated heat and pressure. The elevated heat and pressure of the anti-seal test is performed on a SENCORP™ 12ASL/1 heat sealer. Laminate samples are treated for one second at a pressure of 40 prig and a temperature of 104.4° C., 115.5° C., to 126.7° C., to 137.8° C., to 148.8° C., and 160° C. The bond strength test is performed on 2.54 cm strips of the laminate samples in accordance with the bond strength test. Results are reported in g/25 mm. An average of the results of three samples is the value reported. The test method is hereafter referred to as the "anti-seal test."

Food resistance test: "Food resistance" is a measure of the bond strength of a laminate after the laminate has been exposed to a food simulant at 60° C. oven aging conditions. Pouches measuring 16 in² (103 cm²) are constructed from a pair of films by heat-sealing three of the four edges of the pair of films. The food simulant comprising a mixture of corn oil, vinegar and ketchup is added to each pouch and the open of the filled pouch is sealed. The weight ratio of corn oil to vinegar to ketchup is 1:1:1 based on a total weight of the mixture. The sealed pouch is held at a temperature of 60° C. for 100 h. The pouches are cut into 2.54 cm strips and the bond strength test is performed on the strips in accordance with the bond strength test. Results are reported in g/25 mm. An average of the results of three samples is the value reported. The food simulant being is held at a temperature of 60° C. for 100 h is termed an "aging food simulant." The test method is hereafter referred to as the "food resistance test."

Rigorous food resistance test: "Rigorous food resistance" is a measure of the bond strength of a laminate after the laminate has been exposed to a food simulant at boil-in-bag conditions for 60 min. Pouches measuring 24 in² (155 cm²) are constructed from a pair of films by heat-sealing three of the four edges of the pair of films. The food simulant comprising a mixture of corn oil, vinegar and ketchup is added to each pouch and the open edge of the filled pouch is sealed. The weight ratio of corn oil to vinegar to ketchup is 1:1:1 based on a total weight of the mixture. The sealed pouch is submerged in boiling water for 60 min. The pouches are cut into 2.54 cm strips and the bond strength test is performed on the strips in accordance with the bond strength test. Results are reported in g/25 mm. An average of the results of three samples is the value reported. The food simulant being submerged in boiling water is termed a "boiling food simulant." The test method is hereafter referred to as the "rigorous food resistance test."

Outgassing test: "Outgassing" is a measure of $CO_2$ production within a laminate. $CO_2$ production occurs when compounds of an adhesive composition react with water, e.g., water in the surroundings. Outgassing of $CO_2$ degrades the appearance and seal integrity of a laminate. Outgassing is evaluated on a laminate formed from Al foil adhered to Nylon film with the SLA composition. The appearance of the laminate is visually inspected and reported on a scale from 1 to 5. A "1" is the worst and indicates significant bubble defects. A "2" indicates obvious bubble defects. A "3" indicates slight bubble defects. A "4" indicates minor bubble defects. A "5" is the best and indicates a laminate having uniform appearance. The test method is hereafter referred to as the "outgassing test."

Cleaning ability test: "Cleaning ability" is a measure of the effort required to remove an adhesive composition from lamination equipment. An adhesive composition is mixed with 0.5 wt % water and applied to a laminating roller having a temperature of 40° C. A rub cycle is performed manually against the heated roller using Kimwipes™ treated with ethyl acetate. The number of rub cycles required to remove the adhesive composition completely and expose the entire roller surface is recorded. Fewer rub cycles indicates a better cleaning ability.

Hydroxyl group functionality is the number of hydroxyl groups (—OH groups) present in a compound. Hydroxyl group functionality is measured in accordance with ASTM D4274-16 and is reported in integers from 1 to 6 or greater.

Isocyanate group (NCO) content of an adhesive component is measured in accordance with ASTM D2572-97. NCO content is reported weight percentage based on total weight of the adhesive component.

Viscosity of an adhesive component is measured at 25° C. in accordance with ASTM D2196. Viscosity is reported in mPa·s.

DETAILED DESCRIPTION

The present disclosure provides a process. The process includes providing an isocyanate component (A) and providing a polyol component (B). The isocyanate component (A) includes a blend of an aromatic isocyanate prepolymer and an aliphatic isocyanate prepolymer. The polyol component (B) includes (i) a phosphate-functional polyol, (ii) a polyether polyol, and (iii) an element selected from the group consisting of a polyurethane polyol, a polyester polyol and a combination thereof. The process includes mixing component A and component B to form a solventless adhesive (SLA) composition, wherein a weight ratio of component A to component B is from 2:1 to 1:1, the SLA composition having a pot life from 30 min to 60 min at 40° C. The process includes applying the SLA composition between a first film and a second film to form a raw laminate and curing the raw laminate to form a laminate product.

Isocyanate Component A

The isocyanate component A, (interchangeably referred to as component A), includes an isocyanate prepolymer. The isocyanate prepolymer is the reaction product of a polyisocyanate and at least one polyol. The isocyanate prepolymer is an intermediate in the process of transforming polyisocyanates and polyols into an SLA composition.

A "polyisocyanate" is a molecule that contains at least two isocyanate groups. The polyisocyanate can be an isocyanate or a polyisocyanate. The polyisocyanate bonds to a polyol in a chemical reaction to form an isocyanate prepolymer. Nonlimiting examples of suitable polyisocyanates include aromatic polyisocyanates, aliphatic polyisocyanates, carbodiimide modified polyisocyanates, and combinations thereof.

An "aromatic polyisocyanate" is a polyisocyanate containing one or more aromatic rings. Nonlimiting examples of suitable aromatic polyisocyanates include isomers of methylene diphenyl dipolyisocyanate (MDI) such as 4, 4'-MDI, 2, 4'-MDI and 2, 2'-MDI; or modified MDI such as carbodiimide modified MDI or allophanate modified MDI; isomers of toluene-dipolyisocyanate (TDI) such as 2, 4-TDI, 2, 6-TDI; isomers of naphthalene-dipolyisocyanate (NDI) such as 1, 5-NDI; isomers of xylene dipolyisocyanate (XDI), and combinations thereof.

An "aliphatic polyisocyanate" is a polyisocyanate that is void of, or contains no, aromatic rings. Nonlimiting examples of suitable aliphatic polyisocyanates include isomers of hexamethylene dipolyisocyanate (HDI) such as HDI trimer and HDI biuret, isomers of isophorone dipolyisocyanate (IPDI), and combinations thereof.

In an embodiment, the polyisocyanate is selected from an aliphatic mono-polyisocyanate, an aliphatic di-polyisocyanate, an aliphatic tri-polyisocyanate, and combinations thereof. In a further embodiment, the polyisocyanate is an aliphatic di-polyisocyanate.

In an embodiment, the polyisocyanate is a multifunctional aliphatic polyisocyanate with at least two isocyanate groups, or at least three isocyanate groups.

In an embodiment, the polyisocyanate is selected from an aromatic mono-polyisocyanate, an aromatic di-polyisocyanate, an aromatic tri-polyisocyanate, and combinations thereof. In a further embodiment, the polyisocyanate is an aromatic di-polyisocyanate.

In an embodiment, the polyisocyanate is a multifunctional aromatic polyisocyanate with at least two isocyanate groups, or at least three isocyanate groups.

In an embodiment, the aromatic polyisocyanate has a density from 0.9, or 1.11, or 1.12, or 1.13 to 1.14, or 1.15, or 1.4 g/cm$^3$. In a further embodiment, the aromatic polyisocyanate has a density from 0.9 to 1.4 g/cm$^3$, or from 1.11 to 1.15 g/cm$^3$, or from 1.12 to 1.14 g/cm$^3$. In an embodiment, the aromatic polyisocyanate has a density from 1.125 to 1.135 g/cm$^3$.

In an embodiment, the aromatic polyisocyanate has a viscosity at 25° C. from 100, or 300, or 500, or 1,000, or 2,000 to 4,000, or 8,000, or 20,000, or 30,000, or 50,000 mPa·s. In a further embodiment, the polyether polyol has a viscosity at 25° C. from 100 to 50,000, or from 1,000 to 20,000, or from 2,000 to 4,000 mPa·s.

In an embodiment, the aliphatic polyisocyanate has a density from 0.7, or 0.9, or 1.03, or 1.05, or 1.1, or 1.15 to 1.18, or 1.2, or 1.3, or 1.5, or 1.8 g/cm$^3$. In a further embodiment, the aromatic polyisocyanate has a density from 0.7 to 1.8 g/cm$^3$, or from 1.05 to 1.5 g/cm$^3$, or from 1.1 to 1.2 g/cm$^3$. In another embodiment, the aromatic polyisocyanate has a density from 1.15 to 1.25 g/cm$^3$.

In an embodiment, the aliphatic polyisocyanate has a viscosity at 25° C. from 100, or 300, or 500, or 1,000, or 1,500, or 1,800, or 2,000 to 3,000, or 4,000, or 8,000, or 20,000, or 30,000, or 50,000 mPa·s. In a further embodiment, the polyether polyol has a viscosity at 25° C. from 100 to 50,000, or from 1,000 to 8,000, or from 1,800 to 4,000 mPa·s.

The polyisocyanate may comprise two or more embodiments disclosed herein.

The polyol used to form the isocyanate prepolymer is selected from a polyester polyol, a polyether polyol, an aliphatic polyol, and combinations thereof. The polyester polyol, the polyether polyol, and the aliphatic polyol can be any respective polyester polyol, polyether polyol, and aliphatic polyol disclosed herein.

In an embodiment, the polyol used to form the isocyanate prepolymer includes hydrophobic polyols such as natural oil polyester polyols and modified natural oil polyester polyols. In a further embodiment, the polyol used to form the isocyanate prepolymer includes castor oil and polypropylene-co-ethylene polyol.

The polyol used to form the isocyanate prepolymer may comprise two or more embodiments disclosed herein.

In an embodiment, the isocyanate prepolymer is the reaction product of a polyisocyanate, at least one polyol, and an optional catalyst.

Nonlimiting examples of suitable catalysts include dibutyltin dilaurate, zinc acetate, 2, 2-dimorpholinodiethylether, and combinations thereof.

In an embodiment, the aromatic isocyanate prepolymer has a density from 0.7, or 0.9, or 1.0, or 1.1, or 1.15 to 1.2, or 1.3, or 1.4, or 1.7, or 1.9 g/cm$^3$. In a further embodiment, the aromatic isocyanate prepolymer has a density from 0.7 to 1.9 g/cm$^3$, or from 0.9 to 1.7 g/cm$^3$, or from 1.1 to 1.3 g/cm$^3$.

In an embodiment, the aromatic isocyanate prepolymer has a viscosity at 25° C. from 100, or 250, or 500, or 1,000, or 2,000, or 2,800, or 3,000 to 3,200, or 3,500, or 5,000, or 10,000, or 20,000, or 50,000 mPa·s. In a further embodiment, the aromatic isocyanate prepolymer has a viscosity at 25° C. from 100 to 50,000 mPa·s, or from 250 to 20,000 mPa·s, or from 1,000 to 5,000 mPa·s, or from 2,800 to 3,500 mPa·s, or from 3,000 to 3,200 mPa·s.

In an embodiment, the aromatic isocyanate prepolymer has a isocyanate content from 0.1, or 1, or 5, or 10, or 13 to 15, or 18, 25, or 40 wt %. In a further embodiment, the aromatic isocyanate prepolymer has a isocyanate content from 0.1 to 40 wt %, or from 1 to 25 wt %, or from 5 to 18 wt %, or from 13 to 15 wt %.

In an embodiment, the aliphatic isocyanate prepolymer has a density from 0.7, or 0.9, or 1.0, or 1.1, or 1.15 to 1.2, or 1.3, or 1.4, or 1.7, or 1.9 g/cm$^3$. In a further embodiment, the aliphatic isocyanate prepolymer has a density from 0.7 to 1.9 g/cm$^3$, or from 0.9 to 1.7 g/cm$^3$, or from 1.1 to 1.3 g/cm$^3$.

In an embodiment, the aliphatic isocyanate prepolymer has a viscosity at 25° C. from 100, or 250, or 500, or 1,000, or 2,000, or 2,800, or 3,200 to 3,700, or 4,000, or 5,000, or 10,000, or 20,000, or 50,000 mPa·s. In a further embodiment, the aliphatic isocyanate prepolymer has a viscosity at 25° C. from 100 to 50,000 mPa·s, or from 250 to 20,000 mPa·s, or from 1,000 to 5,000 mPa·s, or from 2,800 to 4,000 mPa·s, or from 3,200 to 3,700 mPa·s.

In an embodiment, the aliphatic isocyanate prepolymer has a isocyanate content from 0.1, or 1, or 5, or 10, or 13 to 16, or 20, or 25, or 40 wt %. In a further embodiment, the aliphatic isocyanate prepolymer has a isocyanate content from 0.1 to 40 wt %, or from 1 to 25 wt %, or from 5 to 20 wt %, or from 13 to 16 wt %.

In an embodiment, the isocyanate component A includes an aromatic isocyanate prepolymer in an amount from 20, or 40, or 60, or 80, or 85 to 90, or 95, or 97, or 99, or 99.5 wt %. In a further embodiment, the isocyanate component A includes an aromatic isocyanate prepolymer in an amount from 20 to 99.5 wt %, or from 60 to 97 wt %, or from 80 to 90 wt %, or from 85 to 90 wt %.

In an embodiment, the isocyanate component A includes an aliphatic isocyanate prepolymer in an amount from 1, or 3, or 5, or 8, or 10 to 15, or 18, or 20, or 30, or 60 wt %. In a further embodiment, the isocyanate component A includes an aliphatic isocyanate prepolymer in an amount from 1 to 60 wt %, or from 3 to 30 wt %, or from 10 to 20 wt %, or from 10 to 15 wt %.

Weight percentages are based on a total weight of the isocyanate component A.

The isocyanate component A may comprise two or more embodiments disclosed herein.

Polyol Component B

The polyol component B (interchangeably referred to as component B), includes (i) a phosphate-functional polyol, (ii) a polyether polyol, and (iii) an element selected from the group consisting of a polyurethane polyol, a polyester polyol and a combination thereof.

The phosphate-functional polyol may be represented by structure I:

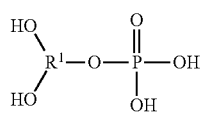

where R$^1$ is any organic group. In addition to the pendant groups shown in structure I, R$^1$ may or may not have one or more additional pendant OH groups. Any two or more of the OH groups may or may not be attached to the same atom of R$_1$. In an embodiment, each OH group is attached to a separate atom of R$^1$.

A convenient way to characterize R1 is to describe the compound having structure II:

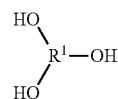

where R$^1$ is the same as in structure I. The compound having structure II is known herein as a "precursor polyol."

In an embodiment, the precursor polyols have molecular weight of 90 or higher; more preferably 200 or higher; more preferably 400 or higher. Preferred precursor polyols have molecular weight of 4,000 or lower; more preferably 2,000 or lower; more preferably 1,200 or lower; more preferably 900 or lower; more preferably 500 or lower.

In an embodiment, the precursor polyols are alkyl higher polyols, monosaccharides, disaccharides, and compounds having structure III:

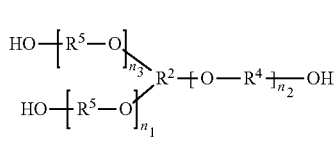

where each of R$^2$, R$^3$, R$^4$, and R$^5$ is, independent of the other, any organic group; each of n$_1$, n$_2$, and n$_3$ is, independent of the other, an integer from 0 to 10. In addition to the pendant groups shown in structure III, R$^2$ may or may not have one or more additional pendant groups. It is further understood that any two or more of the pendant groups may or may not be attached to the same atom of R$^2$. In some embodiments, a mixture of compounds having structure III is present, where the compounds of structure III differ from each other in the value of one or more of n$_1$, n$_2$, and n$_3$; such mixtures are described herein by stating a non-integer value for the parameter n$_1$, n$_2$, or n$_3$, where the non-integer value represents the number average of that parameter. When it is desired to assess the molecular weight of such a mixture, the number-average molecular weight is used.

Among precursor polyols having structure III, preferably each pendant group is attached to a separate atom of R$^2$.

Among precursor polyols having structure III, preferably, one or more of R$^3$, R$^4$, and R$^5$ is a hydrocarbon group having 1 to 4 carbon atoms; more preferably 2 to 3 carbon atoms; more preferably 3 carbon atoms. Among precursor polyols having structure III, preferably, one or more of R$^3$, R$^4$, and R$^5$ is an alkyl group, which may be linear or cyclic or branched or a combination thereof; more preferably, one or more of R$^3$, R$^4$, and R$^5$ is a linear or branched alkyl group; more preferably, one or more of R$^3$, R$^4$, and R$^5$ is a branched alkyl group. Preferably, R$^3$, R$^4$, and R$^5$ are identical to each other.

Among precursor polyols having structure III, preferably, one or more of n$_1$, n$_2$, and n$_3$ is from 0 to 8. Among precursor polyols having structure III, preferably, one or more of n$_1$, n$_2$, and n$_3$ is 1 or more. Among precursor polyols having structure III, preferably, one or more of n$_1$, n$_2$, and n$_3$ is 6 or less. Among precursor polyols having structure III, preferably, n$_1$, n$_2$, and n$_3$ are the same as each other.

In an embodiment, the precursor polyols having structure III are compounds in which each of R$^2$, R$^3$, R$^4$, and R$^5$ is an alkyl group; such precursor polyols are known herein as alkoxylated alkyl triols. In a triol, when at least one of $n_1$, $n_2$, and $n_3$ is 1 or more and R2 has the structure IV:

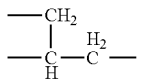

IV then the triol is known herein as an alkoxylated glycerol. In alkoxylated triols, when each of $R^3$, $R^4$, and $R^5$ is a branched alkyl group with exactly 3 carbon atoms, the alkoxylated triol is known herein as a propoxylated triol. A propoxylated triol in which $R^2$ has structure IV is known herein as propoxylated glycerol.

Among precursor polyols that are alkyl higher polyols, preferred are those with 10 or fewer carbon atoms; more preferred are those with 6 or fewer carbon atoms; more preferred are those with 3 or fewer carbon atoms; more preferred is glycerol.

More preferred precursor polyols are alkyl higher polyols and compounds having structure III; more preferred are compounds having structure III. It is noted that, if $n_1=n_2=n_3=0$ and if $R^2$ is either an alkyl group or an alkyl group having hydroxyl groups, then the compound having structure III is an alkyl higher polyol.

A preferred group of precursor polyols are alkyl triols and alkoxylated alkyl triols. Among these, more preferred are glycerol and alkoxylated glycerols; more preferred are alkoxylated glycerols. Among alkoxylated glycerols, preferred are propoxylated glycerols.

Another class of suitable phosphate-functional polyols are those that contain urethane linkages. Preferably, members of this class are made by reacting one or more suitable phosphate-functional polyol with one or more polyisocyanate. The polyisocyanate includes any aromatic polyisocyanate or aliphatic polyisocyanate described herein. In an embodiment, the polyisocyanate of the phosphate-functional polyol is 2,2'-MDI; 2,4'-MDI; 4,4'-MDI; carbodiimide-modified 2,2'-MDI; carbodiimide-modified 2,4'-MDI; carbodiimide-modified 4,4'-MDI; and combinations thereof.

In an embodiment, the amount of polyisocyanate is kept low enough so that some or all of the reaction products are phosphate-functional polyols. Alternatively, the polyol may be first reacted with the polyisocyanate to make an OH terminated prepolymer which is then reacted with polyphosphoric acid.

In an embodiment, a method of making the phosphate-functional polyol is to react a precursor polyol with phosphoric-type acid to produce the compound having structure I.

In an embodiment, the amounts of phosphoric-type acid and precursor polyol are chosen to determine the ratio of Mp:Mx as follows:
Mhy=number of hydroxyl groups per molecule of the precursor polyol
Nx=Mhy−2
Mx=(moles of precursor polyol)×Nx
Mp=moles of phosphorous atoms contained in the phosphoric-type acid. Preferably, the ratio of Mp:Mx is 0.1:1 or higher; more preferably 0.2:1 or higher; more preferably 0.5:1 or higher; more preferably 0.75:1 or higher. Preferably, the ratio of Mp:Mx is 1.1:1 or less.
Preferably, the weight ratio of phosphoric-type acid to precursor polyol is 0.005:1 or higher; more preferably 0.01:1 or higher; more preferably 0.02:1 or higher. Preferably, the weight ratio of phosphoric-type acid to precursor polyol is 0.3:1 or lower; more preferably 0.2:1 or lower; more preferably 0.12:1 or lower.

Preferably, the phosphoric-type acid contains polyphosphoric acid. Preferably, the amount of polyphosphoric acid in the phosphoric-type acid is, by weight based on the weight of the phosphoric-type acid, 75% or more; more preferably 80% or more; more preferably 90% or more. Polyphosphoric acid is available in various grades; each grade is characterized by a percentage. To determine the grade, it is first recognized that pure monomeric orthophosphoric acid, the content of phosphorous pentoxide is considered to be 72.4%. Any grade of polyphosphoric acid can also be analyzed, to consider that one mole of polyphosphoric acid (formula weight labeled "Fppa") contains the number of moles of phosphorous pentoxide labeled "Nppo," and the phosphorous pentoxide percentage ("PCppo") is given by PCppo=(Nppox142)/Fppa, expressed as a percentage. Then, the grade of that polyphosphoric acid is the ratio, expressed as a percentage: Grade=PCppo/72.4.

Preferably, polyphosphoric acid is used that has grade of 100% or higher; more preferably 110% or higher. Preferably, polyphosphoric acid is used that has grade of 150% or lower; more preferably 125% or lower.

In an embodiment, the phosphate-functional polyol has a total phosphoric acid content from 0.05%, or 0.1%, or 0.2%, or 0.5% to 1.5%, or 1.8%, or 2% or 3%. In a further embodiment, the phosphate-functional polyol has a total phosphoric acid content from 0.05 to 3%, or from 0.1 to 2%, or from 0.5 to 1.5%.

In an embodiment, the phosphate-functional polyol has a viscosity at 25° C. from 5,000, or 10,000, or 15,000 to 20,000, or 30,000, or 40,000 mPa·s. In a further embodiment, the phosphate-functional polyol has a viscosity at 25° C. from 5,000 to 40,000 mPa·s, or from 10,000 to 30,000 mPa·s, or from 15,000 to 20,000 mPa·s.

In an embodiment, the Mn of the phosphate-functional polyol is from 300, or 600, or 900 to 1,100, or 3,000, or 10,000 s. In a further embodiment, the Mn of the phosphate-functional polyol is from 300 to 10,000, or from 600 to 3,000, or from 900 to 1,100.

In an embodiment, the Mw of the phosphate-functional polyol is from 300, or 800, or 1,500 to 2,000, or 6,000, or 10,000 s. In a further embodiment, the Mw of the phosphate-functional polyol is from 300 to 10,000, or from 800 to 6,000, or from 1,500 to 2,000.

A nonlimiting example of a suitable phosphate-functional polyol is disclosed in International Publication No. WO 2015/168670, the entire contents of which are incorporated herein.

The phosphate-functional polyol may comprise two or more embodiments disclosed herein.

Component B includes a polyether polyol. A "polyether polyol" is a compound that is a polyether and a polyol. Nonlimiting examples of suitable polyether polyols include polyaddition products of ethylene oxide, propylene oxide, tetrahydrofuran, butylene oxide, and the co-addition and grafted products thereof; the polyether polyols obtained by condensation of polyhydric alcohols, or mixtures thereof; and combinations thereof.

Nonlimiting examples of suitable polyether polyols include polypropylene glycol (PPG), polyethylene glycol (PEG), polybutylene glycol, polytetramethylene ether glycol (PTMEG), and combinations thereof.

In an embodiment, the polyether polyol has a molecular weight from 50, or 100, or 300, or 400 to 600, or 1,000, or 2,000, or 3,000, or 4,000 or 5,000 g/mol. In a further embodiment, the polyether polyol has a molecular weight from 50 to 4,000, or from 100 to 2,000, or from 400 to 600 g/mol.

In an embodiment, the polyether polyol has a density from 0.7, or 0.9, or 1.0, or 1.03 to 1.05, or 1.1, or 1.15, or 1.2, or 1.3, or 1.6 g/cm$^3$. In a further embodiment, the polyether polyol monomer has a density from 0.7 to 1.6 g/cm$^3$, or from 0.9 to 1.3 g/cm$^3$, or from 1.0 to 1.1 g/cm$^3$, or from 1.03 to 1.05 g/cm$^3$.

In an embodiment, the polyether polyol has a viscosity at 25° C. from 100, or 300, or 500, or 800, or 1,100 to 1,200, or 1,300, or 2,000 or 8,000, or 20,000, or 50,000 mPa·s. In a further embodiment, the polyether polyol has a viscosity at 25° C. from 100 to 50,000, or from 500 to 8,000, or from 800 to 2,000 or from 1,100 to 1,300 mPa·s.

In an embodiment, the polyether polyol has a hydroxyl group functionality from 1.5 or 2.0 to 3.0. In a further embodiment, the polyether polyol has a hydroxyl group functionality from 1.5 to 3.0, or from 2.0 to 3.0.

The polyether polyol of the polyol component B may comprise two or more embodiments disclosed herein.

In an embodiment, the polyol component B includes a polyurethane polyol. The polyurethane polyol is the reaction product of a polyisocyanate and at least one polyol. The polyisocyanate includes any aromatic polyisocyanate or aliphatic polyisocyanate described herein. The polyol includes any polyol described herein.

In an embodiment, the polyurethane polyol is a hydroxyl-terminated polyurethane resin.

In an embodiment, component B includes a polyester polyol. A "polyester polyol" is a compound that is a polyester and a polyol. Nonlimiting examples of suitable polyester polyols include polycondensates of diols, polyols (e.g., triols, tetraols), dicarboxylic acids, polycarboxylic acids (e.g., tricarboxylic acids, tetracarboxylic acids), hydroxy-carboxylic acids, lactones, and combinations thereof. The polyester polyols can also be derived from, instead of the free polycarboxylic acids, the corresponding polycarboxylic anhydrides, or corresponding polycarboxylic esters of lower alcohols.

Nonlimiting examples of suitable diols include ethylene glycol, butylene glycol, diethylene glycol (DEG), triethylene glycol, polyalkylene glycols, such as polyethylene glycol, 1,2-propanediol, 1,3-propanediol, 1,3-butanediol, 1,4-butanediol, 2-methyl-2,4-pentanediol (MPD), 1,6-hexanediol (HDO), neopentyl glycol (NPG), 1,8-octane diol, and combinations thereof. In an embodiment, the diol includes diols having a hydrocarbon backbone containing 12 or more carbon atoms.

Nonlimiting examples of suitable dicarboxylic acids include aliphatic acids, aromatic acids, and combinations thereof. Nonlimiting examples of suitable aromatic acids include phthalic acid, isophthalic acid, terephthalic acid, and tetrahydrophthalic acid. Nonlimiting examples of suitable of suitable aliphatic acids include hexahydrophthalic acid, hexane dicarboxylic acid, cyclohexane dicarboxylic acid, octane dicarboxylic acid, dodecane dicarboxylic acid, adipic acid, azelaic acid, sebacic acid, glutaric acid, tetrachlorophthalic acid, maleic acid, fumaric acid, itaconic acid, malonic acid, suberic acid, 2-methyl succinic acid, 3, 3-diethyl glutaric acid, 2, 2-dimethyl succinic acid, and trimellitic acid. As used herein, the term "acid" also includes any anhydrides of said acid. Saturated aliphatic and/or aromatic acids are also suitable, such as adipic acid or isophthalic acid.

In an embodiment, monocarboxylic acids, such as benzoic acid and hexane carboxylic acid, are excluded from the solventless adhesive composition.

In an embodiment, the polyester polyol is a natural oil polyol or the transesterification reaction product of natural oil polyol and a polyester polyol. The polyester polyol suitable for use in the transesterification reaction includes any polyester polyol described herein.

In an embodiment, the polyester polyol is castor oil. In a further embodiment, the polyester polyol is the transesterification reaction product of castor oil and a polyester polyol.

In an embodiment, the polyester polyol has a molecular weight from 500 g/mol to 2,000 g/mol, or 3,000 g/mol, or 4,000 g/mol. In a further embodiment, the polyester polyol has a molecular weight from 500 g/mol to 2,000 g/mol.

In an embodiment, the polyester polyol has a density from 0.7, or 0.9, or 1.0, or 1.03 to 1.05, or 1.1, or 1.15, or 1.2, or 1.3, or 1.6 g/cm$^3$. In a further embodiment, the aromatic polyisocyanate has a density from 0.7 to 1.6 g/cm$^3$, or from 0.9 to 1.3 g/cm$^3$, or from 1.0 to 1.1 g/cm$^3$, or from 1.03 to 1.05 g/cm$^3$.

In an embodiment, the polyester polyol has a viscosity at 25° C. from 100, or 300, or 500, or 800, or 900 to 1,000, or 1,200, or 2,000 or 8,000, or 20,000, or 50,000 mPa·s. In a further embodiment, the polyether polyol has a viscosity at 25° C. from 100 to 50,000, or from 500 to 8,000, or from 800 to 1,200, or from 900 to 1,000 mPa·s.

In an embodiment, the polyester polyol has a hydroxyl group functionality from 1.5, or 2.0 to 3.0. In a further embodiment, the polyester polyol has a hydroxyl group functionality from 1.5 to 3.0, or from 2.0 to 3.0. To achieve hydroxyl group functionality greater than 2, polyols having a hydroxyl group functionality of 3 or more (e.g., trimethylolpropane (TMP), glycerol, erythritol, pentaerythritol, trimethylolbenzene, and/or trishydroxyethyl isocyanurate) may be included in the polyester polyol.

The polyester polyol may comprise two or more embodiments disclosed herein.

In an embodiment, component B has from 0.5 wt %, or 1 wt %, or 3 wt %, or 6 wt %, or 8 wt %, or 10 wt % to 12 wt %, or 14 wt %, or 16 wt %, or 25 wt %, or 50 wt % phosphate-functional polyol. In another embodiment, component B has from 0.5 to 50 wt %, or from 1 wt % to 50 wt %, or from 6 wt % to 16 wt %, or from 10 wt % to 12 wt % phosphate-functional polyol.

In an embodiment, component B has from 5 wt %, or 10 wt %, or 20 wt % to 60 wt %, or 80 wt %, or 90 wt % polyether polyol. In another embodiment, component B has from 5 wt % to 90 wt %, or from 10 wt % to 80 wt %, or from 20 wt % to 60 wt % polyether polyol.

In an embodiment, component B has from 0.05 wt %, or 0.1 wt %, or 0.5 wt %, or 1 wt % to 50 wt %, or 60 wt %, or 70 wt %, or 80 wt % polyester polyol. In another embodiment, component B has from 0.05 wt % to 80 wt %, or from 0.5 wt % to 70 wt %, or from 1 wt % to 50 wt % polyester polyol.

In an embodiment, component B has from 5 wt %, or 10 wt %, or 20 wt %, or 30 wt % to 40 wt %, or 50 wt % to 60 wt % to 70 wt %, or 80 wt %, or 90 wt % polyurethane polyol. In another embodiment, component B has from 10 wt % to 90 wt %, or from 20 wt % to 80 wt %, or from 20 wt % to 60 wt %, from 20 wt % to 40 wt % polyurethane polyol.

In an embodiment, component B has from 1 to 50 wt %, or from 8 to 14 wt %, or from 10 to 12 wt % of the phosphate-functional polyol and from 60 to 99 wt %, or from 85 to 95 wt %, or from 88 to 92 wt % of the polyether polyol.

In an embodiment, component B has from 1 to 50 wt %, or from 8 to 14 wt %, or from 10 to 12 wt % of the phosphate-functional polyol and from 60 to 90 wt %, or from 87 to 98 wt %, or from 90 to 96 wt % of the polyester polyol.

Weight percentages are based upon the total weight of the polyol component B.

The polyol component B may comprise two or more embodiments disclosed herein.

It is understood that the sum of the weights of the compounds (polyisocyanates, polyols) in any component disclosed herein (e.g., component A) is 100 percent, based on a total weight of the respective component.

C. Mixing (A) and (B) to Form an SLA Composition

The process includes mixing an isocyanate component (A) and a polyol component (B) to form a solventless adhesive (SLA) composition.

A "solventless adhesive" composition is an adhesive composition that is void of, or substantially void of, a solvent.

It is contemplated that component A and component B can be formed separately and, if desired, stored until it is desired to use the SLA composition. When it is desired to use the SLA composition, component A and component B are brought into contact with each other and mixed together. It is contemplated that when the two components are brought into contact, a curing reaction begins in which the isocyanate groups react with hydroxyl groups to form urethane linkages. The SLA composition formed by bringing the two components into contact is termed a "curable mixture."

In an embodiment, component A and component B is each a liquid at 25° C.

In an embodiment, component A is heated to and maintained at a temperature from 25° C., or 40° C., or 45° C., or 50° C. to 55° C., or 65° C., or 70° C. or 80° C.; component B is heated to and maintained at a temperature from 25° C., or 40° C., or 45° C., or 50° C. to 55° C., or 65° C., or 70° C. or 80° C.; and component A and component B are brought into contact with each other and mixed. In a further embodiment, component A is heated to and maintained at a temperature from 30° C. to 60° C., or from 35° C.5 to 55° C.; component B is heated to and maintained at a temperature from 25° C. to 80° C., or from 30° C. to 55° C.; and component A and component B are brought into contact with each other and mixed.

Component A and component B are mixed with any means suitable for forming the composition as described herein. In an embodiment, component A and component B are mixed with a high speed mixer or a continuous mixing nozzle.

In an embodiment, the SLA composition has a weight ratio of component A to component B from 100:400, or 100:200, or 100:150, or 100:100, or 100:95, or 100:91, or 100:90, or 100:87, or 100:85, or 100:83, or 100:82, or 100:80 to 100:70, or 100:68, or 100:66, or 100:64, or 100:60, or 100:50, or 100:30, or 100:20, or 100:10, or 100:5. In a further embodiment, the SLA composition has a weight ratio of component A to component B from 1:4 to 20:1, or from 10:9 to 10:3, or from 100:85 to 100:64, or from 100:80 to 100:70.

In an embodiment, the SLA composition has the phosphate-functional polyol present in an amount from 0.1, or 1, or 4 to 7, or 20 or 40 wt %. In a further embodiment, the SLA composition has the phosphate-functional polyol present in an amount from 0.1 to 40 wt %, or from 1 to 20 wt %, or from 4 to 7 wt %. Weight percentage of the phosphate-functional polyol is based on a total weight of the SLA composition (i.e., the sum of the weights of component A and component B).

The SLA composition has a pot life. The pot life is measured from the time the SLA composition is formed. In an embodiment, the pot life is from 20 min, or 30 min, or 35 min, or 40 min to 50 min, or 60 min, or 70 min, or 90 min, or 200 min at 40° C. In a further embodiment, the pot life is from 20 to 200 min, or from 35 to 90 min, or from 35 to 70 min, or from 40 to 60 min at 40° C. The pot life is measured in accordance with the pot life test described herein.

The SLA composition has a primary aromatic amine (PAA) decay level. The PAA decay level is reported in parts per billion (ppb). In an embodiment, the PAA decay level is from 0.01 ppb, or 0.1 ppb, or 0.5 ppb, to 1.0, or 1.4, or 1.9 ppb. In a further embodiment, the PAA decay level is from 0.01 to 1.9 ppb, or from 0.1 ppb to 1.4 ppb, or from 0.5 to 1.4 ppb, or from 0.5 to 1 ppb. In another embodiment, the PAA decay level is measured after 24 hours curing at 25° C. and 50% humidity and in accordance with the PAA decay test described herein.

D. Applying the SLA Composition

The process includes applying the SLA composition between a first film and a second film to form a raw laminate. In an embodiment, the SLA composition is applied onto the first film that is then laminated with the second film to form the raw laminate. Nonlimiting examples of suitable methods of applying the SLA composition include brushing, pouring, spraying, coating, rolling, spreading, and injecting.

In an embodiment, the SLA composition is applied with the use of the laminator. Nonlimiting examples of laminators suitable for use to apply the SLA composition include a Labcombi pilot machine coater and a Nordmeccanica Super Combi 3000 laminator. In an embodiment, the laminator is a non-mechanical super simplex laminator. A non-mechanical super simplex laminator applies a pre-mixed SLA composition on the first film that is laminated onto the second film by (i) metering of each component (the polyol component and the isocyanate component), (ii) mixing the isocyanate component A and the polyol component B, and (iii) dispensing the mixture onto the first film.

The SLA composition is applied between the first film and the second film at a temperature from 35° C., or 40° C., or 45° C. to 50° C., or 55° C., or 60° C., or 70° C. or 80° C., or 85° C. In an embodiment, the SLA composition is applied between the first film and the second film at a temperature from 35° C. to 55° C.

In an embodiment, the SLA composition is applied at a coating weight from 1 g/m$^2$, or 1.1 g/m$^2$, or 1.2 g/m$^2$, or 1.5 g/m$^2$, or 2 g/m$^2$ to 3 g/m$^2$, or 4 g/m$^2$, or 5 g/m$^2$, or 8 g/m$^2$, or 15 g/m$^2$. In a further embodiment, the SLA composition is applied at a coating weight from 1 to 15 g/m$^2$, or from 1.2 to 5 g/m$^2$, or from 1.5 to 3 g/m$^2$. In another embodiment, the SLA composition is applied at a coating weight from 1 to 1.2 g/m$^2$, or from 1 to 1.1 g/m$^2$. Not wishing to be bound by any particular theory, it is believed that the use of a SLA composition enables a lower coating weight, or coating weight from 1.2 to 5 g/m$^2$, or from 1.5 to 3 g/m$^2$ compared to conventional solvent-based adhesives. A lower coating weight is advantageous to reduce costs, to reduce the weight of the adhesive applied to the film layers, and to reduce the weight of the laminate product.

The process of applying the SLA composition may comprise two or more embodiments disclosed herein.

The process includes the step of curing the raw laminate to form the laminate product. The raw laminate product is cured at a temperature from 20° C., or 25° C., or 30° C. to 35° C., or 40° C., or 50° C. for a period of time from 4 hours (h), or 8 h, or 12 h to 18 h, or 24 h, or 36 h, or 48 h, or 72 h. In an embodiment, the raw laminate is cured at a temperature from 20° C. to 35° C. for a period of time from 6 h to 72 h, or from 12 h to 36 h, or from 20 h to 28 h.

In an embodiment, curing is complete after holding the raw laminate at a temperature from 20° C. to 25° C. for 24 h.

In an embodiment, curing the raw laminate includes drying the raw laminate. In a further embodiment, curing the raw laminate excludes passing the raw laminate through an oven.

The process of the present disclosure may comprise two or more embodiments disclosed herein.

E. Laminate Product

The present disclosure provides a laminate product.

In an embodiment, the laminate product is a multilayer film. In a further embodiment, the laminate product is a pouch. In an embodiment, the pouch is used for packaging food products.

The laminate product includes a first film, a second film, and a solventless adhesive (SLA) composition disposed between the first film and the second film. The SLA composition of the laminate product is any SLA composition described herein.

In an embodiment, the first film and the second film are independently selected from the group consisting of metallized films, aluminum foils, polymer films, ink-printed films, coated films, co-extruded films, polyethylene (PE) films, polyethylene terephthalate (PET) films, polyester films, polyolefin based films, polyamide based films, copolymer films and paper.

In an embodiment, the composition of the first film is the same as the composition of the second film. In a further embodiment, the composition of the first film is different than the composition of the second film.

Each film has a thickness from 5 μm, or 12 μm, or 20 μm to 40 μm, or 70 μm, or 200 μm, or 300 μm. In another embodiment, each film has a thickness from 5 to 300 μm, or from 12 to 70 μm, or from 20 μm to 40 μm. Each film may have the same thickness or a different thickness than the other film. In an embodiment, each film has the same thickness.

The laminate product may comprise two or more embodiments disclosed herein.

In an embodiment, the bond strength of the laminate product is measured after the laminate product is exposed to conditions of elevated pressure and temperature as described in the anti-seal test.

In an embodiment, the laminate product includes 48 g PET film and white PE film and has a bond strength from 3,415 to 4,000 g/25 mm after being exposed to conditions of elevated pressure and temperature as described in the anti-seal test. In an embodiment, the laminate product includes 48 g PET film and white PE film and has a bond strength from 3,580 to 4,200 g/25 mm after being exposed to conditions of elevated pressure and temperature as described in the anti-seal test. In an embodiment, the laminate product includes 48 g PET film and white PE film and has a bond strength from 2,680 to 3,550 g/25 mm after being exposed to conditions of elevated pressure and temperature as described in the anti-seal test. In an embodiment, the laminate product includes 48 g PET film and white PE film and has a bond strength from 1,650 to 3,030 g/25 mm after being exposed to conditions of elevated pressure and temperature as described in the anti-seal test.

The bond strength after the anti-seal test can be termed an anti-seal value. In an embodiment, the anti-seal value of the laminate product is from 2 to 12 times more than the anti-seal value of a laminate product formed with a solventless adhesive composition not comprising a phosphate-functional polyol.

In an embodiment, the bond strength of the laminate product is measured after the laminate product is exposed to an aging food simulant as described in the food resistance test. In an embodiment, the bond strength of the laminate product is measured after the laminate product is exposed to a boiling food simulant as described in the rigorous food resistance test. The bond strength obtained after the food resistance test or after the rigorous food resistance test is measured in accordance with the bond strength test.

In an embodiment, the laminate product includes 48 g PET film and PE film and has a bond strength from 510 to 725 g/25 mm after being exposed to an aging food simulant. In an embodiment, the laminate product includes 48 g PET film and PE film and has a bond strength from 600 to 850 g/25 mm after being exposed to a boiling food simulant.

In an embodiment, the laminate product includes 48 g PET film and white PE film and has a bond strength from 390 to 760 g/25 mm after being exposed to an aging food simulant. In an embodiment, the laminate product includes 48 g PET film and white PE film and has a bond strength from 830 to 900 g/25 mm after being exposed to a boiling food simulant.

In an embodiment, the laminate product includes metallized film and PE film and has a bond strength from 140 to 400 g/25 mm after being exposed to an aging food simulant. In an embodiment, the laminate product includes metallized film and PE film and has a bond strength from 900 to 1020 g/25 mm after being exposed to a boiling food simulant.

The bond strength after the food resistance test or the rigorous food resistance test can be termed a food resistance value. In an embodiment, the food resistance value of the laminate product is from 200 to 400 percent more than the food resistance value of a laminate product formed with a solventless adhesive composition not comprising a phosphate-functional polyol.

In an embodiment, the PAA decay level of the laminate product is from 180 to 220 percent less than the PAA decay level of a laminate product formed with a solventless adhesive composition not comprising a phosphate-functional polyol.

In an embodiment, the outgassing rating of the laminate product is from 300 to 500 percent more than the outgassing rating of a laminate product formed with a solventless adhesive composition not comprising a phosphate-functional polyol.

By way of example, and not limitation, some embodiments of the present disclosure will now be described in detail in the following examples.

EXAMPLES

The raw materials for use in the Inventive Examples ("IE") and Comparative Samples ("CS") are detailed in Table 1 below.

TABLE 1

| Commercial Name | Composition/properties | Source |
|---|---|---|
| *Component A* | | |
| PACACEL™ L75-191 | Aromatic isocyanate MDI-based<br>Density: 1.11-1.15 g/cm$^3$<br>Viscosity: 2,000-4,000 mPa·s@25° C. | The Dow Chemical Company |
| MOR-FREE™ C-33 | Aliphatic isocyanate HDI trimer<br>Density: 1.1-1.2 g/cm$^3$<br>Viscosity: 1800-4000 mPa·s@25° C. | The Dow Chemical Company |
| Adcote™ 577 | Solvent-based isocyanate<br>Density: 1.14-1.18 g/cm$^3$<br>Viscosity: 3800-4000 mPa·s@25° C.<br>Solid content: 75% | The Dow Chemical Company |
| *Component B* | | |
| Coreactant I | Blend of propylene-based polyether polyol, polyurethane polyol, and 2 wt % phosphate-functional polyol<br>Density: 1.0-1.1 g/cm$^3$<br>Viscosity: 1100-1300 mPa·s @ 25° C. | |
| Coreactant II | Blend of polyester polyol, polyether polyol, and 8% phosphate-functional polyol<br>Density: 1.0-1.1 g/cm$^3$<br>Viscosity: 800-1200 mPa·s @ 25° C. | |
| Phosphate-functional polyol | Phosphoric acid content: 0.5 to 3 wt %<br>Viscosity: 5,000-40,000 mPa·s @ 25° C.<br>Mn: 900 to 1,100; Mw: 1,500 to 2,000 | The Dow Chemical Company |
| Adcote™ L87-124 | Solvent-based polyol<br>Density 1.03-1.05 g/cm3<br>Viscosity: 900-1000 mPa·s @ 25° C.<br>Solid content: 89% | The Dow Chemical Company |
| CR-85 | Solventless polyol blend<br>Density: 0.99-1.02 g/cm$^3$<br>Viscosity: 600-800 mPa·s @ 25° C. | The Dow Chemical Company |

Solventless adhesive (SLA) compositions for Inventive Examples IE 1, IE 2, IE 3 and Comparative Samples CS 1, CS 2, CS 3 are prepared according to the formulations listed in Table 2 using the raw materials listed in Table 1.

The SLA compositions are used to prepare laminates from film substrates. The SLA compositions are applied onto a first film that is laminated to a second film to form the laminate product. The first film is selected from either (i) 48-gauge polyethylene terephthalate (PET) or (ii) aluminum foil. The second film is selected from either (i) polyethylene (PE) or (ii) white pigmented PE. Lamination is conducted using a LABO COMBI pilot machine coater. Temperature of SLA composition is 40° C. Temperature of machine coater nip is 40° C.

The films are laminated at 100 meters per minute with the coating weights listed in Table 2.

A solvent-based adhesive was used for Comparative Sample 3 (CE 3).

The laminates are cured at 25° C. and 50% humidity for 7 days.

The performance results are summarized at the bottom of Table 2.

TABLE 2

| Component | CS1 | CS2 | CS3 | IE2 | IE3 | IE1 |
|---|---|---|---|---|---|---|
| *Weight Percentages based on component A* | | | | | | |
| PACACEL™ L75-191 | 100 | 87.5 | | 87.5 | 87.5 | 87.5 |
| C-33 | | 12.5 | | 12.5 | 12.5 | 12.5 |
| Adcote™ 577 | | | 100 | | | |
| *Weight Percentages based on component B* | | | | | | |
| Coreactant I | 100 | | | 90 | | |
| Coreactant II | | | | | 93 | 100 |
| Phosphate-functional polyol | | | | 10 | 7 | |
| Adcote™ L87-124 | | | 100 | | | |
| CR-85 | | 100 | | | | |
| Phosphate-functional polyol in Component B (wt %) | | | | 12 | 14 | 8 |
| *Solentless Adhesive Composition* | | | | | | |
| A/B weight-to-weight ratio | 100/60 | 100/50 | 100/7 | 100/64 | 100/82 | 100/85 |
| Phosphate-functional polyol in SLA composition (wt %) | | | | 5 | 7 | 4 |
| Coating weight (g/m$^2$) | 1.8 | 1.7 | 4.1 | 1.8 | 1.7 | 1.8 |
| *Performance* | | | | | | |
| Pot life (min) | 60 | 38 | | 38 | 41 | 49 |
| PAA Decay (ppb) | 1.483 | | | 0.847 | 0.762 | 0.621 |
| Outgassing Rating | 1 | 1 | | 3 | 4 | 5 |
| *Food Resistance for 48 g PET//PE [Bond Strength (g/25 mm)]* | | | | | | |
| Rigorous | 143 | 228 | 483 | 593 | 600 | 843 |
| Aging | 250 | 183 | 383 | 560 | 718 | 505 |
| *Food Resistance for 48 g PET//white PE [Bond Strength (g/25 mm)]* | | | | | | |
| Rigorous | 575 | 550 | | 893 | 828 | 848 |
| Aging | 348 | 313 | | 688 | 750 | 380 |
| *Food Resistance for Al foil//PE [Bond Strength (g/25 mm)]* | | | | | | |
| Rigorous | 298 | 268 | 808 | 1010 | 893 | 988 |
| Aging | 15 | 13 | 330 | 138 | 385 | 283 |

TABLE 2-continued

| Component | CS1 | CS2 | CS3 | IE2 | IE3 | IE1 |
|---|---|---|---|---|---|---|
| Anti-Seal for 48 g PET//white PE [Bond Strength (g/25 mm)] | | | | | | |
| 104.4° C. | | 10 | 15 | 18 | 18 | 30 |
| 115.5° C. | | 30 | 80 | 148 | 315 | 360 |
| 126.7° C. | | 1280 | 1463 | 1640 | 3013 | 2893 |
| 137.8° C. | | 1213 | 2400 | 2663 | 3503 | 3360 |
| 148.8° C. | | 1398 | 2853 | 3560 | 3768 | 4153 |
| 160.0° C. | | 1403 | 2798 | 3413 | 3630 | 3958 |
| Curing Time (h) | Cleaning Ability (Number of Rub Cycles) | | | | | |
| 5 | | 10 | 40 | 10 | 20 | 10 |
| 8 (run 1) | | 35 | 118 | 10 | 110 | 35 |
| 8 (run 2) | | 45 | 123 | 10 | 115 | 50 |

Applicant unexpectedly discovered that laminates formed between matched films using a solventless adhesive composition containing a phosphate-functional polyol exhibit bond strength from 593 g/25 mm to 1010 g/25 mm after a rigorous food resistance test and bond strength from 3413 g/25 mm to 3958 g/25 mm after an anti-seal test at 160° C. Laminates formed between aluminum foil and polyethylene exhibit bond strength from 893 g/25 mm to 1010 g/25 mm after a rigorous food resistance test.

Laminates formed between matched films using a solventless adhesive composition containing a phosphate-functional polyol exhibit a pot life from 38 min to 49 min; a primary aromatic amine decay level from 0.621 ppb to 0.847 ppb; and an outgassing rating from 3 to 5.

It is specifically intended that the present disclosure not be limited to the embodiments and illustrations contained herein, but include modified forms of those embodiments including portions of the embodiments and combinations of elements of different embodiments as come with the scope of the following claims.

What is claimed is:

1. A process comprising:
   providing an isocyanate component A comprising a blend of (i) from 90 wt % to 80 wt % of an aromatic isocyanate prepolymer and (ii) from 10 wt % to 20 wt % of an aliphatic isocyanate prepolymer, based on a total weight of component A;
   providing a polyol component B comprising a blend of;
   (i) a phosphate-functional polyol,
   (ii) a polyether polyol, and
   (iii) an element selected from the group consisting of a polyurethane polyol, a polyester polyol and a combination thereof;
   mixing component A and component B to form a solventless adhesive (SLA) composition, wherein a weight ratio of component A to component B is from 2:1 to 1:1, the SLA composition having a pot life from 30 min to 60 min at 40° C.;
   applying the SLA composition between a first film and a second film to form a raw laminate; and
   curing the raw laminate to form a laminate product.

2. The process of claim 1, comprising providing component B wherein the phosphate-functional polyol is present in an amount from 6 wt % to 16 wt %, based on a total weight of component B.

3. The process of claim 1, comprising forming the SLA composition wherein the phosphate-functional polyol is present in an amount from 4 wt % to 7 wt %, based on a total weight of the SLA composition.

4. The process of claim 1, wherein the first film is composed of polyethylene terephthalate (PET) and the second film is composed of polyethylene (PE), the process further comprising forming a laminate product having an anti-seal value from 3,415 to 3,960 g/25 mm at 160° C., as measured in accordance with the anti-seal test.

5. The process of claim 4, comprising forming a laminate product having a primary aromatic amine (PAA) level from 0.1 to 1.4 parts per billion (ppb) after 24 hours curing at 25° C. and 50% humidity, as measured in accordance with the PAA decay test.

6. A two-component solventless adhesive (SLA) composition comprising:
   an isocyanate component A comprising a blend of (i) from 90 wt % to 80 wt % of an aromatic isocyanate prepolymer and (ii) from 10 wt % to 20 wt % of an aliphatic isocyanate prepolymer, based on a total weight of component A;
   a polyol component B comprising a blend of;
   (i) a phosphate-functional polyol,
   (ii) a polyether polyol, and
   (iii) an element selected from the group consisting of a polyurethane polyol, a polyester polyol and a combination thereof;
   the composition having
   a weight ratio of component A to component B from 2:1 to 1:1;
   a pot life from 30 min to 60 min at 40° C.; and
   a primary aromatic amine decay level from 0.1 pbb to 1.4 pbb after 24 hours curing at 25° C. and 50% humidity.

7. The composition of claim 6, wherein the phosphate-functional polyol is present in an amount from 6 wt % to 16 wt %, based on a total weight of component B.

8. The composition of claim 6, wherein the phosphate-functional polyol is present in an amount from 4 wt % to 7 wt %, based on a total weight of the SLA composition.

9. A laminate product comprising:
   a first film;
   a second film; and
   a solventless adhesive composition disposed between the first film and the second film, the solventless adhesive composition comprising
   (a) an isocyanate component A comprising a blend of (i) from 90 wt % to 80 wt % of an aromatic isocyanate prepolymer and (ii) from 10 wt % to 20 wt % of an aliphatic isocyanate prepolymer, based on a total weight of component A;

(b) a polyol component B comprising a blend of
  (i) a phosphate-functional polyol,
  (ii) a polyether polyol, and
  (iii) an element selected from the group consisting of a polyurethane polyol, a polyester polyol and a combination thereof;
the composition having
a weight ratio of component A to component B from 2:1 to 1:1;
a pot life from 30 min to 60 min at 40° C.; and
a primary aromatic amine decay level from 0.1 pbb to 1.4 pbb after 24 hours curing at 25° C. and 50% humidity.

10. The laminate product of claim 9, wherein the first film is composed of polyethylene terephthalate (PET) and the second film is composed of polyethylene (PE), the laminate product having a bond strength from 3,415 g/25 mm to 4,000 g/25 mm, as measured in accordance the anti-seal test.

11. The laminate product of claim 9, wherein the first film is composed of polyethylene terephthalate (PET) and the second film is composed of polyethylene (PE), the laminate product having a bond strength from 595 g/25 mm to 850 g/25 mm, as measured in accordance with the rigorous food resistance test.

12. The laminate product of claim 9, wherein the first film is composed of polyethylene terephthalate (PET) and the second film is composed of white pigmented polyethylene, the laminate product having a bond strength from 830 g/25 mm to 900 g/25 mm, as measured in accordance with the rigorous food resistance test.

13. The laminate of claim 9 wherein the first film is a metallized film and the second film is composed of polyethylene (PE), the laminate having a bond strength from 900 g/25 mm to 1020 g/25 mm, as measured in accordance with the rigorous food resistance test.

* * * * *